United States Patent [19]

Gerstenberger

[11] Patent Number: 5,727,776
[45] Date of Patent: Mar. 17, 1998

[54] FLUID CONTROL VALVE

[75] Inventor: Gerald Ross Gerstenberger, Bradenton Manatee, Fla.

[73] Assignee: Dana Corporation, Toledo, Ohio

[21] Appl. No.: 596,862

[22] Filed: Feb. 9, 1996

[51] Int. Cl.⁶ .................................................. F16K 25/00
[52] U.S. Cl. ........................... 251/368; 251/332; 251/903
[58] Field of Search ..................... 251/332, 129.11, 251/903, 357, 368; 137/468, 613

[56] References Cited

U.S. PATENT DOCUMENTS

| | | |
|---|---|---|
| 3,137,475 | 6/1964 | Schoenecker et al. ........ 251/129.11 X |
| 3,236,256 | 2/1966 | Valentine . |
| 3,326,520 | 6/1967 | Guenther . |
| 3,340,893 | 9/1967 | Lockwood ........................ 137/468 |
| 3,445,089 | 5/1969 | Murray . |
| 3,531,086 | 9/1970 | Shannon . |
| 3,955,792 | 5/1976 | Cho ........................... 251/129.11 X |
| 4,023,774 | 5/1977 | Kojima ............................ 251/903 X |
| 4,196,886 | 4/1980 | Murray . |
| 5,060,910 | 10/1991 | Iwata et al. ................. 251/129.11 X |
| 5,249,773 | 10/1993 | Feld ................................ 251/129.11 |
| 5,370,357 | 12/1994 | Jones . |

*Primary Examiner*—Kevin Lee
*Attorney, Agent, or Firm*—Millen, White, Zelano, & Braingan, P.C.

[57] ABSTRACT

Needle valves which are seated in valve seats defined by circular edges have DELRIN® tips for the purpose of minimizing unseating torque which would otherwise be excessive due to the thermal expansion and contraction characteristics of the valve seats and the needle valves. In salt spreaders with aluminum valve seats and steel needle valves, the needle valves become stuck in the valve seats if the needle valves are seated after operation in frigid weather and the salt spreaders are subsequently garaged to raise the temperature of the valve seat and needle valves. By utilizing the DELRIN® tips, the needle valves do not become stuck.

16 Claims, 4 Drawing Sheets

FLUID CONTROL VALVE

FIELD OF THE INVENTION

The present invention relates to a fluid control valve. More particularly, the present invention relates to a fluid control valve having a valve seat of one material and a valve stem having a valve tip of another material.

BACKGROUND OF THE INVENTION

Fluid flow regulating valves are used for many purposes. One use of such valves is with salt spreaders mounted on trucks and used to dispense road salt to lower the freezing temperature of water on roads so that ice is eliminated and the formation of ice from water and snow minimized. Normally, trucks equipped for salt spreading include an auger which advances salt from a supply on the truck bed and the spinner which scatters salt pellets or granulars as the salt is dropped from the auger onto the spinner. Both the auger and spinner are driven by hydraulic motors, the flow to which is controlled by a fluid flow regulating valves. The fluid flow regulating valves are mounted in an aluminum block, which aluminum block has unitary circular valve seats. The circular valve seats are formed by walls which define circular openings with circular edges. Flow through the valve seats is controlled by steel needle valves which are adjusted axially with respect to the valve seats with electric motors which rotate in a first direction to narrow the restriction between the needle valve and the valve seat and a second direction to widen the restriction. When it is desired to stop rotation of the auger and spinner, their respective needle valves are advanced into engagement with the valve seats to close the valves.

It has been found that with salt spreaders operating in low temperatures of, for example, 10° F. to 40° F. below 0° F., the circular valve seats and needle valve tips undergo substantial contraction. It has been found that when the trucks are garaged after exposure to these low temperatures, the aluminum block and steel needle valves expand in such a way that the needle valves become wedged or fixed in their valve seats. When it is attempted to unseat the valves by rotating the valves, it has been found that the electric motors which rotate the needle valves frequently cannot generate sufficient torque to unseat the valves. It has been found that due to the thermal expansion properties of steel and aluminum, the unseating torque can double, triple or be even further increased.

It has further been found that if a needle is used in a valve application where the regulated work port pressure and that of an associated actuator or cylinder is operating at a very high pressure when the needle valve is shut off, the envelope or area containing the needle valve can expand slightly. As the regulated work port pressure at the actuator or cylinder decays, the envelope or area containing the needle valve contracts, thus wedging the needle valve tip within the seat. When this situation occurs, it has been found that the unscrewing or unseating torque can be double or triple the tightening torque so that the motor operating the needle valve may be unable to develop sufficient torque to unseat the valve tip.

While the background art includes a number of patents in which needle valves have tips of different materials, such as resinous materials, these tips are for the purpose of increasing the effectiveness of the seal rather than for keeping unseating torque to levels which can be generated by motors driving the valves.

SUMMARY OF THE INVENTION

In view of the aforementioned considerations, it is a feature of the present invention to provide a new and improved fluid flow regulating valve which does not become stuck in the closed position due to thermal expansion and contraction or expansion and contraction due to pressure.

In view of this feature and other features, the present invention is directed to a fluid flow regulating valve which comprises a metal valve block having a valve seat with a first coefficient of expansion with a wall defining a circular opening with a circular edge disposed about a central axis. The valve further comprises a valve stem of a material having a second coefficient of expansion and extending coaxially with respect to the central axis. The valve stem has a valve tip of resilient material fixed thereto for seating against the circular edge to seal the circular opening. The resilient material is a material selected to yield with respect to the circumference of the circular edge as the circular edge expands and contracts, whereby the valve tip does not become irremovably wedged when the valve seat, valve stem and valve tip are subjected to temperature and pressure changes.

In a further aspect, the fluid flow regulating valve includes a motor having a drive shaft connected to the valve stem for advancing and retracting the valve stem by rotating the motor in opposite directions.

In still a further aspect of the present invention, the valve body is aluminum, the valve stem is steel and the valve tip is configured of a resinous material, which is preferably an acetal resin such as DELRIN®.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
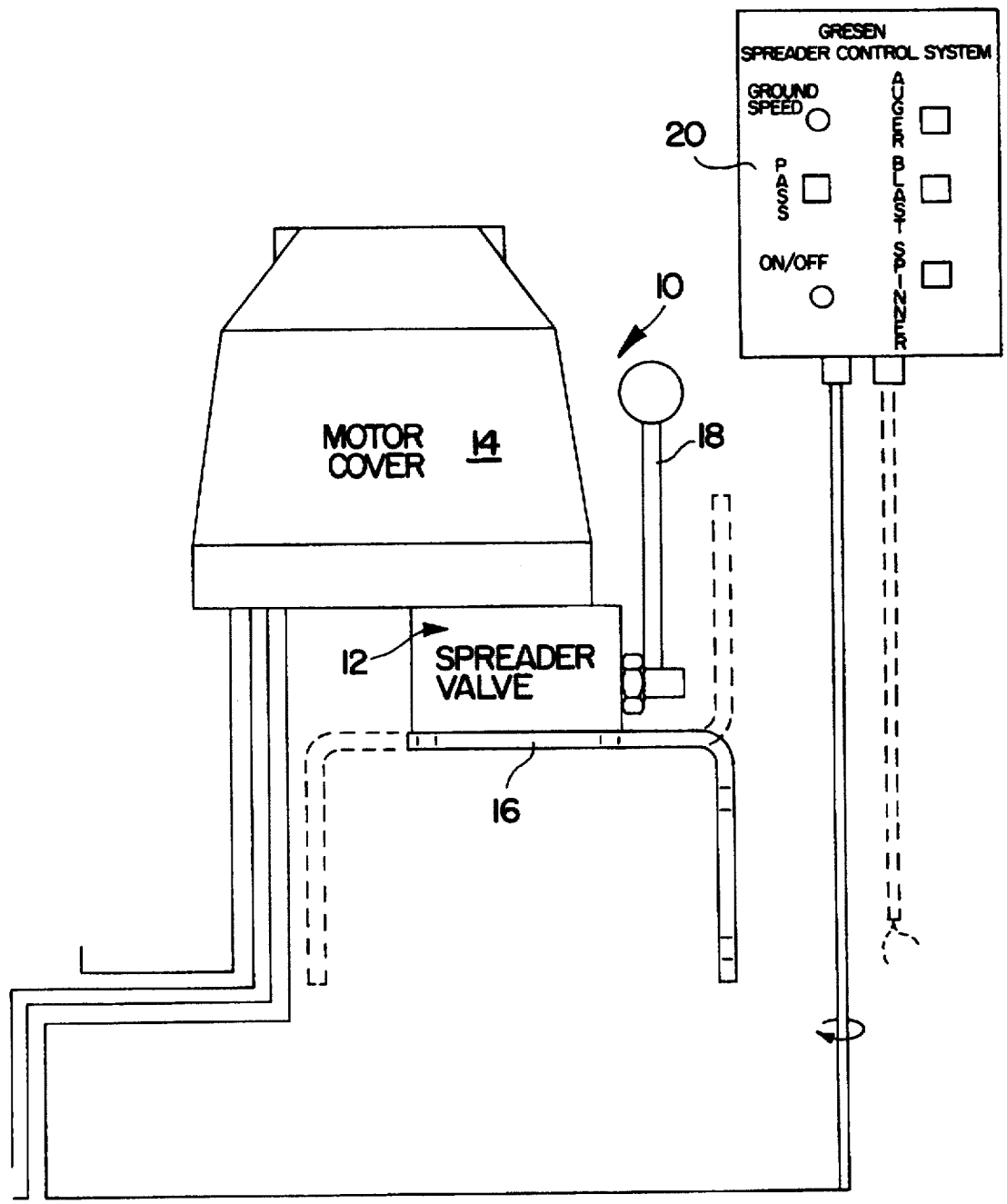
FIG. 1 is a side view of a control valve assembly incorporating therein the features of the present invention.

Referring now to FIG. 1, there is shown a spreader control valve assembly 10 comprises a valve 12 and a motor compartment 14. The control valve assembly 10 is mounted by an L-shaped bracket 16 on a truck (not shown). An operating handle 18 functions in conjunction with a control panel 20 to control flow of hydraulic fluid to an auger drive motor (not shown) and a spreader drive motor (not shown) mounted on a truck for dispensing road salt granulars.

Figure 2:
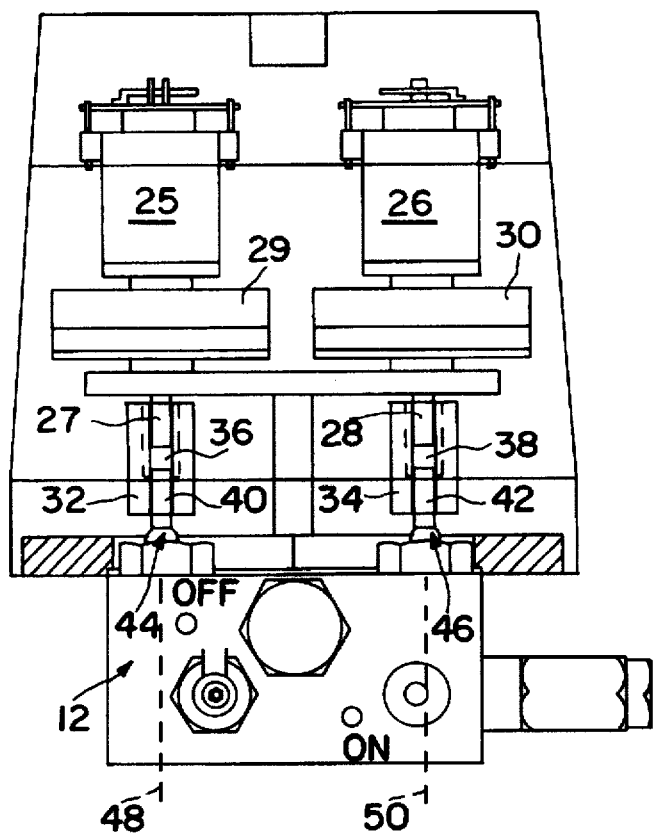
FIG. 2 is a front view of the assembly of FIG. 1 with portions deleted, taken along lines 2—2 of FIG. 1.

Referring now to FIG. 2 where a front view of the control valve assembly 10 is shown with the motor compartment 14 of FIG. 1 removed, it is seen that a first electric motor 25 and a second electric motor 26 rotate dry shafts 27 and 28.

respectively through reduction gears 29 and 30, respectively. The drive shafts 27 and 28 have square cross-sections and are connected by sleeves 32 and 34 with square bores 36 and 38 to the square first ends 40 and 42 of needle valves 44 and 46 configured in accordance with the principles of the present invention to operate hydraulic motors (not shown) for a spinner and an auger, respectively. It is emphasized that as the drive shafts 27 and 28 rotate, the square shanks 40 and 42 of the needle valves 44 and 46 move axially in the direction of axes 48 and 50, respectively.

Figure 3:
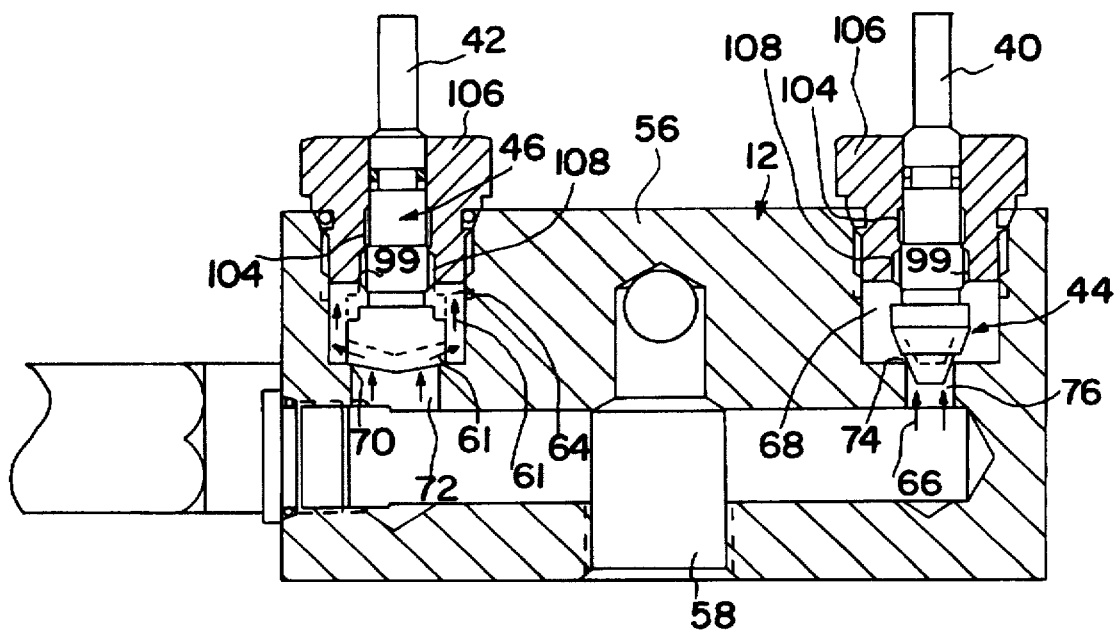
FIG. 3 is a top elevation of an associated valve component lines 3—3 of FIG. 4.
Figure 4:
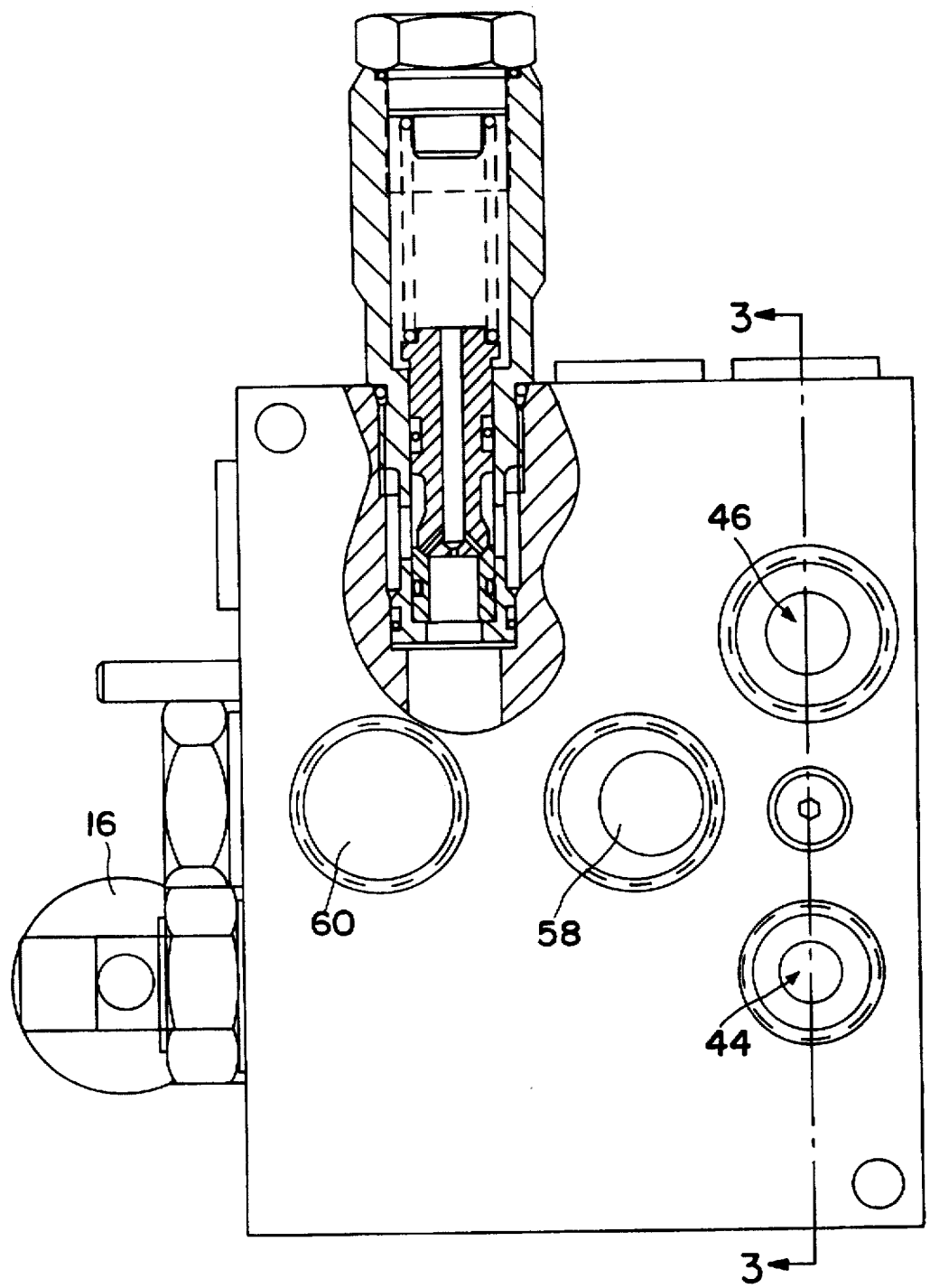
FIG. 4 is a bottom view, with portions broken away of the valve component of FIG. 3.

Referring now to FIGS. 3 and 4, it is seen that the valve 12 includes a valve block 56 which includes an inlet 58 into which pressurized hydraulic fluid flows. When the auger (not shown) controlled by the needle valve 46 is not operating and the spinner controlled by the spinner needle valve 44 is not operating, the fluid entering the inlet port 58 of the valve body 56 flows to tank via a tank port 60 shown in the bottom view of FIG. 4. When the auger needle valve 46 is opened as is seen in the dotted line position of FIG. 3, then the hydraulic fluid follows the path of arrows 61 into chamber 64. When the spinner needle valve 44 is opened to the dotted line position, then hydraulic fluid passes in the direction of arrow 66 into chamber 68. The chamber 64 is connected to the auger motor (not shown) while the chamber 68 is connected to the spinner motor (not shown).

Figure 5:
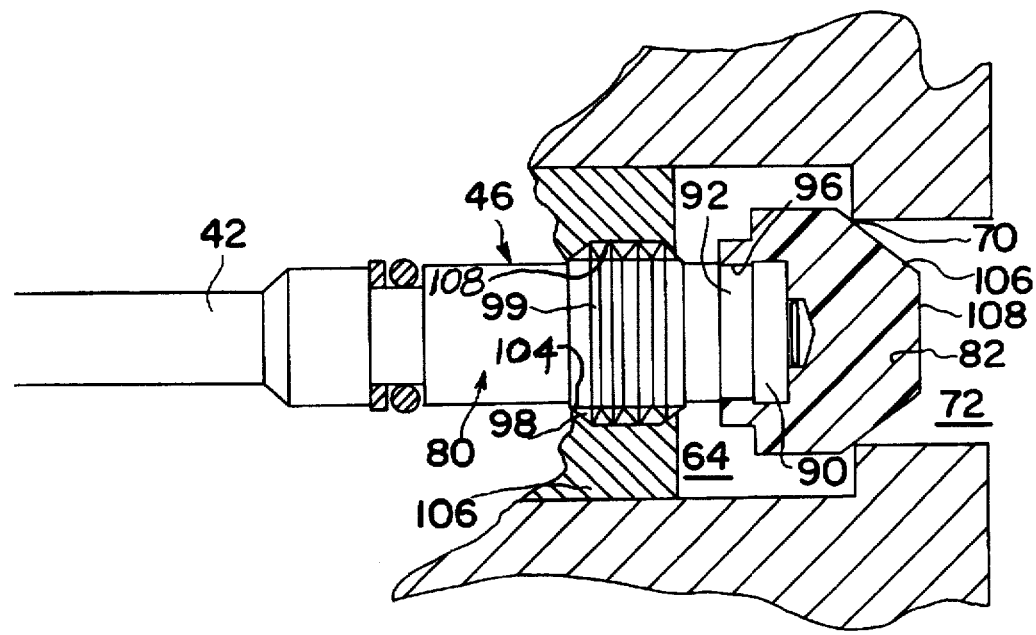
FIG. 5 is a side view of a needle valve configured in accordance with the principles of the present invention and having a tip illustrated in cross-section.
Figure 6:
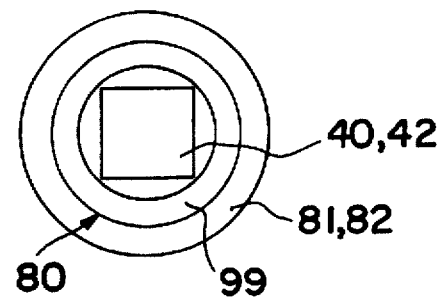
FIG. 6 is a rear view of the needle valve of FIG. 5.
Figure 7:
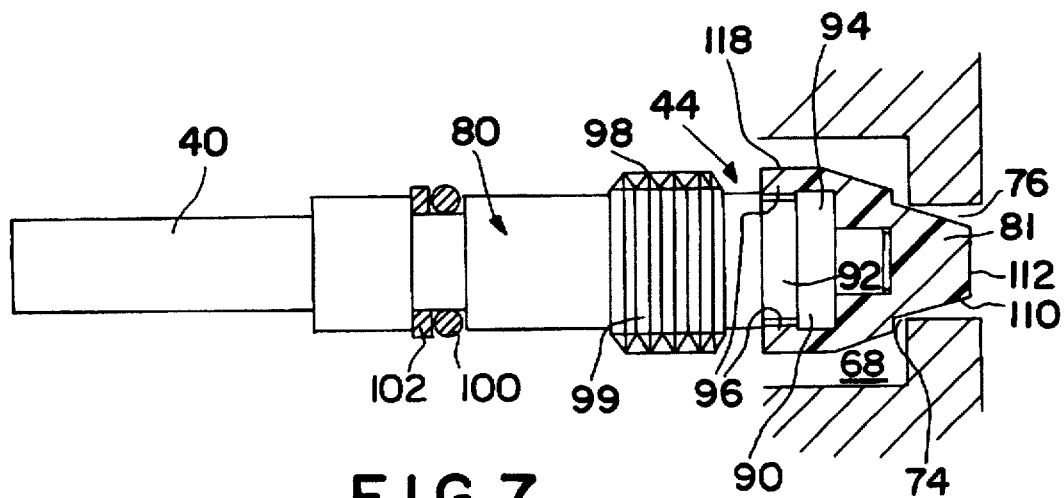
FIG. 7 is a side view of a needle valve configured in accordance with the principles of the present invention but having a tip of a different configuration from that of FIG. 5.

Referring now to FIGS. 5, 6 and 7 in conjunction with FIGS. 3 and 4, it is seen that the valve block 56 has a first valve seat 70 at the interface of the chamber 64 and a bore 72 which connects the chamber 64 to the inlet 58 and the valve seat 74 at the interface between the spinner chamber 68 and a bore 76 which connects the spinner chamber 68 to the hydraulic fluid inlet 58. The valve seats 70 and 74 are each circular edges which essentially form line contact with the needle valves 46 and 44 when the needle valves are closed.

As is best seen in FIGS. 5, 6 and 7, the needle valves 44 and 46 each have substantially identical valve stems 80 made of stainless steel, but have different valve tips 81 and 82. The valve tip 82 is used to control flow to the auger motor (not shown) while the valve tip 81 is used to control flow to the spinner motor (not shown). As will be explained further hereinafter, the valve tip 82 has a greater diameter at the line of engagement with the valve seat 70 (see FIG. 5) than the diameter of the valve tip 81 with the valve seat 74 (see FIG. 7).

The steel valve stem 80 of FIGS. 5-7 includes a first end 90 which has a circular groove 92 spaced slightly inboard of an end portion 94. The circular groove 92 receives a shallow annular fib 95 of which ever of the valve tips 82 or 84 is installed on the steel valve stem 80. Spaced from the circular groove 92 is a helical portion 98 which includes a thread 99 and spaced from the helical portion 98 is an annular groove 100. Received within the annular groove 100 is an O-ring 101 or gasket 102. Axially spaced from the groove 100 are the square shank portions 40 or 42 (see FIGS. 2 and 3) which are received into the square bores 36 and 38 of the coupling sleeves 32 and 34 (see FIG. 2).

Referring now to FIGS. 5 and 7 in conjunction with FIG. 3, it is seen that the valve stems 80 are received through circular bores 104 in plugs 105 that are threaded into the auger fluid chamber 64 and the spinner fluid chamber 68. The bores 104 each have a helical portion 108 which cooperates with and complements the threads 99 of the threaded portions 98 of the steel valve stems 80 which provide helixes thereon so that when the valve stems are rotated in one direction by the motors 25 and 26, the valve stems advance axially toward their respective valve seats 70 and 74 and when rotated in the opposite direction, back away from their respective valve seats. In other words, each valve stem 80 includes a helix 98 which cooperates with a complementary member in the form of the threaded portion 108 which is fixed with respect to the valve body 56 by virtue of the plugs 106 which are threaded into and fixed in the valve body.

Referring again to FIG. 5 where the valve tip 82 used to control flow to the auger is shown, it is seen that the valve tip 82 has a relatively large frustoconical sealing surface 106 and a flat end 109. As is seen in FIG. 7, the valve tip 81 has a relatively small frustoconical sealing surface 110 and a flat end 112. The frustoconical sealing surface 110 adjoins a frustoconical surface 114 at a radial step 116. Extending in the axial direction from frustoconical surface 114 is the surface 118 from which the annular rib 96 extends inwardly to seat within the annular groove 92 of the steel valve stem 80.

Preferably, the valve tips 82 and 84 are made of a resinous material and the preferred resinous material is DELRIN® 100 which is an acetal resin available from E.I. DuPont deMurers & Co., Inc.

By configuring the valve tips 82 and 84 of a resinous material such as an acetal resin, the valves 44 and 46 no longer remain wedged in the seated position so tightly that the motors 25 and 26 cannot generate sufficient torque to unseat the needle valves. Moreover, when a valve, such as the valve 12 is utilized in an application where the regulated work port pressure is very high and the needle valve is closed off with the envelope or area containing the needle valve in an expanded state due to the high pressure, the needle valve can still be unseated after the regulated work port pressure decays, causing the contact area to contract.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fluid flow regulating valve comprising:

a metal valve block having a metal valve seat having a first coefficient of expansion and having a wall defining a circular opening with a circular edge disposed about a central axis;

a valve stem of a material having a second coefficient of expansion with respect to the central axis, the valve stem having a first end and a second end;

a valve tip of resilient acetal resin material fixed to the first end of the valve stem for seating against the circular edge to seal the circular opening, the resilient material being a material selected to yield with respect to the circumference of the circular edge as the circular edge expands and contracts whereby the valve tip does not become irremovably wedged when the valve seat, valve stem and valve tip are exposed to temperature and pressure changes.

2. The fluid flow regulating valve of claim 1 further including a motor having a drive shaft connected to the valve stem for advancing and retracting the valve tip in the direction of the central axis toward and away from the valve seat.

3. The fluid flow regulating valve of claim 2 further including a helix on the valve stem which cooperates with a complementary member fixed with respect to block whereby as the motor turns the valve stem, the valve stem advances and retracts in the direction of the central axis.

4. The fluid flow regulating valve of claim 3, wherein the valve stem is coupled to the motor by a sliding coupling which non-rotatably receives the second end of the valve stem and non-rotatably receives the drive shaft of the motor.

5. The fluid flow regulating valve of claim 1, wherein the acetal resin is DELRIN® 100.

6. The fluid flow regulating valve of claim 1, wherein the metal valve block is part of a salt spreader assembly.

7. In a hydraulic system for driving hydraulic motors which operate augers and spinners in a salt spreader, a valve assembly including electric motors which drive an auger needle valve and a spinner needle valve, the improvement comprising for each needle valve:

a metal valve block having a metal valve seat having a first coefficient of expansion and having a wall defining circular opening with a circular edge disposed about a central axis;

a valve stem of a material having a second coefficient of expansion with respect to the central axis, the valve stem having a first end and a second end;

a valve tip of resilient material fixed to the first end of the valve stem for seating against the circular edge to seal the circular opening, the resilient material being a material selected to yield with respect to the circumference of the circular edge as the circular edge expands and contracts whereby the valve tip does not become irremovably wedged when the valve seat, valve stem and valve tip are exposed to temperature and pressure changes.

8. The fluid flow regulating valve of claim 7, wherein the resilient material of the valve tip is a resinous material.

9. The fluid flow regulating valve of claim 8, wherein the resinous material is an acetal resin.

10. The fluid flow regulating valve of claim 9, wherein the acetal resin is DELRIN® 100.

11. A fluid flow regulating valve comprising:

a metal valve block which is part of a salt spreader assembly, the metal valve block having a metal valve seat having a first coefficient of expansion and having a wall defining a circular opening with a circular edge disposed about a central axis;

a valve stem of a material having a second coefficient of expansion with respect to the central axis, the valve stem having a first end and a second end;

a valve tip of resilient material fixed to the first end of the valve stem for seating against the circular edge to seal the circular opening, the resilient material being a material selected to yield with respect to the circumference of the circular edge as the circular edge expands and contracts whereby the valve tip does not become irremovably wedged when the valve seat, valve stem and valve tip are exposed to temperature and pressure changes.

12. The fluid flow regulating valve of claim 11 further including a motor having a drive shaft connected to the valve stem for advancing and retracting the valve tip in the direction of the central axis toward and away from the valve seat.

13. The fluid flow regulating valve of claim 12 further including a helix on the valve stem which cooperates with a complementary member fixed with respect to the valve body whereby as the motor turns the valve stem, the valve stem advances and retracts in the direction of the central axis.

14. The fluid flow regulating valve of claim 17, wherein the valve stem is coupled to the motor by a sliding coupling which non-rotatably receives the second end of the valve stem and non-rotatably receives the drive shaft of the motor.

15. The fluid flow regulating valve of claim 11, wherein the resilient material of the valve tip is a resinous material.

16. The fluid flow regulating valve of claim 11, wherein the resinous material is an acetal resin.

* * * * *